Aug. 23, 1966  B. F. FLEMING  3,267,905
LEASH FOR ANIMALS
Filed June 8, 1964
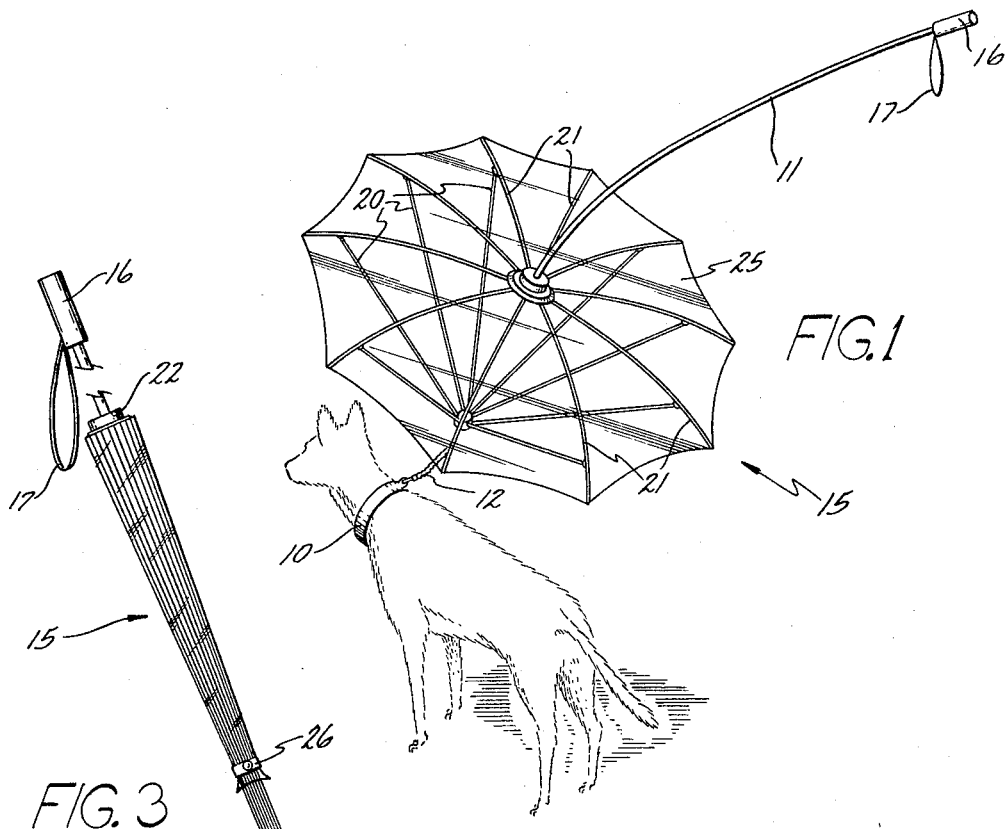
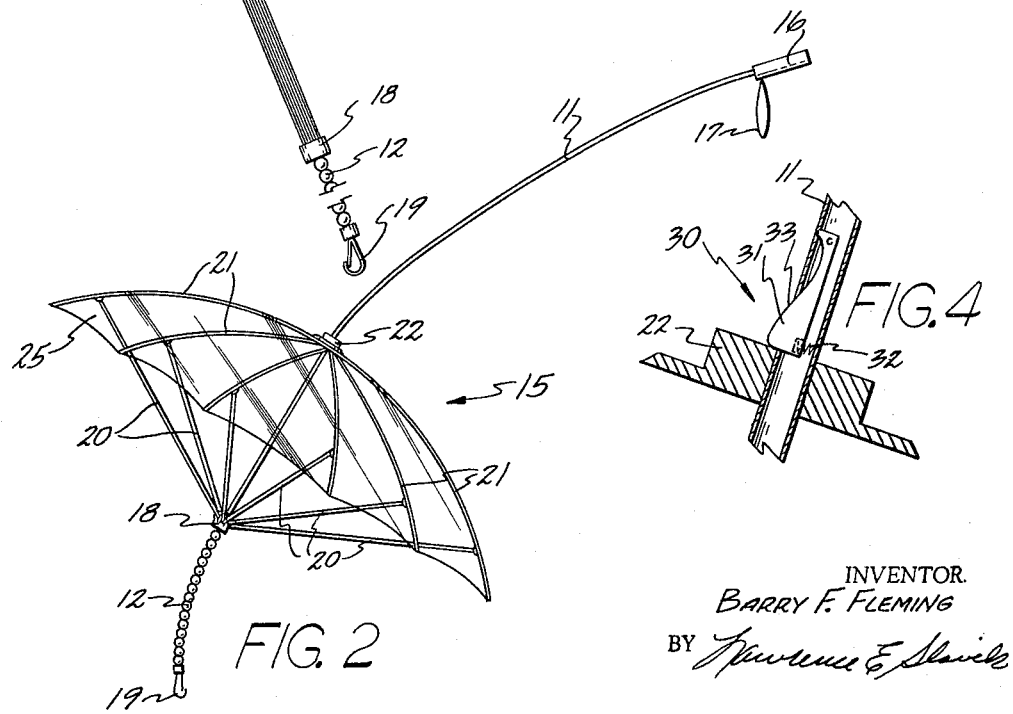
INVENTOR.
BARRY F. FLEMING
BY
ATTORNEY United States Patent Office 3,267,905
Patented August 23, 1966

3,267,905
LEASH FOR ANIMALS
Barry Francis Fleming, Los Angeles, Calif., assignor of one-fourth to Lawrence E. Slavik, Milwaukee, Wis.
Filed June 8, 1964, Ser. No. 373,433
8 Claims. (Cl. 119—109)

This invention relates generally to animal leashes and more particularly to an improved leash that incorporates a shield for protecting the animal from the weather while it is confined by the leash.

Pets, and particularly dogs, that live in the residences of their masters must be taken for walks outdoors for health and sanitary reasons. It is usually desirable that these pets be under the complete control of their masters during such walks and they are therefore fastened to a leash for the purpose of limiting their activities. Moreover, many urban communities have enacted laws prohibiting the release of such pets out of doors, and permitting them to be out of doors only when tethered by a leash.

It is essential that these pets be taken out of doors daily regardless of weather conditions. Some animals are frightened by precipitation and there are other reasons why it may be desirable to protect the pet from inclement weather while it is out of doors under leash. As a matter of fact, it may be desired to protect the animal from excessive exposure to the hot sun.

It is therefore a general object of the present invention to provide an improved leash for pets that includes a shield for protecting the animal from either precipitation or excessive sunlight.

Another object is to provide a leash equipped with a shield for protecting the animal without hampering the normal activities of the pet while under the control of a leash.

Another object is to provide a leash with a shield that may be opened for protecting the pet and may be collapsed to a closed position for storage and for enabling the leash to be employed in the conventional manner.

A further object is to provide an improved leash incorporating a shield for the protection of the pet which operates with outstanding efficiency and is of simple and inexpensive but sturdy construction.

According to this invention the improved leash for pets comprises a shaft having a handle at one end and a shield on the opposite end. The shield is carried by a plurality of hinged ribs that are extended by a plurality of supports which can be positioned to radiate from the bottom of the shaft. The ribs and the radiating supports are hingedly attached so that the entire shield can be collapsed against the shaft when not in use. A flexible chain or cable extends from the bottom of the shaft for attachment to a collar or a harness on the pet.

The foregoing and other objects of the invention which will become more fully apparent from the following detailed specification setting forth an illustrative embodiment, may be achieved by the particular apparatus described in connection with the accompanying drawings, in which:

FIGURE 1 is a perspective view of a leash incorporating the features of the present invention, the leash being shown attached to a collar on a dog;

FIGURE 2 is an elevational view of the leash depicted in FIGURE 1;

FIGURE 3 is an elevation view of the leash shown in FIGURE 1, with the shield being collapsed against the supporting shaft; and FIGURE 4 is an enlarged detail view of a lock for retaining the shield in the open position that is illustrated in FIGURE 2.

Reference is now made more particularly to the drawings and specifically to FIG. 1 thereof which illustrates an improved dog leash constructed in accordance with the teachings of the present invention. The leash is shown in FIG. 1 attached to a collar 10 that is fastened about the neck of a dog. The improved leash comprises a shaft 11 that has a flexible chain or cable 12 extending from its lower end and carries a collapsible shield directly above the chain 12, the shield being generally identified in the drawings by the reference numeral 15.

The shaft 11 is of relatively rigid construction with an arcuate set in it as clearly shown in FIG. 2 but preferably has a small amount of flexibility so that it will yield slightly and be relatively light in weight. The upper end of the shaft 11 is provided with a handle 16 that may be grasped by the person leading the animal and a strap 17 is attached to the handle 16 for embracing the wrist of the person, if desired, to prevent an accidental release of the handle and to facilitate restraining the animal that is being controlled by the leash.

The lower end of the shaft 11 is provided with a fixed collar 18 and the chain 12 extends from its bottom end for attachment to the collar 10 on the animal. The extending end of the chain 12 is attached to the collar by means of a snap hook 19 that is securely attached to the end of the chain 12.

The shield 15 comprises a plurality of supports 20 radiating from the collar 18 into engagement with cooperating ribs 21 that radiate from a sleeve 22 which is slidable along the shaft 11. A liquid impervious flexible material 25 such as plastic or treated fabric is attached to the ribs 21 to form the shield for the animal that is secured to the cable 12.

The supports 20 are pivotally secured at their lower end to the collar 18 and are likewise in pivotal engagement at their opposite ends with the ribs 21 a slight distance from the exterior end of the ribs. The ribs 21, in turn, are pivotably attached to the sleeve 22. This construction enables the shield 15 to be collapsed against the shaft 11. In order to collapse the shield it is only necessary to slide the sleeve 22 upwardly along the shaft 11 and as this occurs, the ribs 21 pivot inwardly toward the shaft 11 relative to the sleeve 22 and at the same time, the supports 20 pivot both with respect to the collar 18 and the ribs 21 to correspondingly move inwardly toward the shaft 11 along with the ribs 21. In the meantime, the fabric 25 is collapsing with the inward movement of the ribs 21 until when the sleeve 22 is in its fully retracted position toward the handle 16 the supports 20 and the ribs 21 are retracted against the shaft 11 as clearly shown in FIG. 3 and the fabric 25 is loosely disposed about the shaft 11. The ribs 21 and the associated fabric 25 may be tightly retained around the shaft 11 by a strap 26 which is provided with a suitable snap for holding it about the assembly.

In order to open the shield 15 from the condition illustrated in FIG. 3 to the position depicted in FIG. 2, the strap 26 is snapped open to release the shield and the sleeve 22 is slid downwardly along the shaft 11. Such downward movement of the sleeve 22 causes the ribs 21 and their cooperating supports 20 to pivot relative to each other which causes them to extend outwardly of the shaft 11 to spread the fabric 25 until the latter is fully stretched over the extending ribs 21. When the shield 15 is fully opened, the ribs 21 are slightly sprung so that they act as a spring to urge the collar 22 in an upward direction.

However, the collar 22 is held in position to retain the shield 15 open by a lock generally identified by the reference numeral 30 and clearly illustrated in FIG. 4. The lock 30 comprises a stop 31 disposed within a slot formed in the shaft 11 and urged outwardly of the slot by a spring 32. The spring 32 urges the stop 31 outwardly of its cooperating slot sufficiently to expose a cam surface 33 formed along the edge of the stop 31 to cooperate with the sleeve 22 when the shield 15 is being opened. Thus, as the sleeve 22 is moved downwardly along the shaft 11, it engages the cam surface 33 to force the stop 31 inwardly of its cooperating slot against the pressure of the spring 32. The stop 31 is moved completely within the core of the shaft 11 to permit the collar 22 to pass over it.

When the collar 22 has passed the stop 31, the spring 32 urges the stop to its normal position extending outwardly of the shaft and the spring action of the ribs 21 cooperating with the supports 20 urges the top surface of the collar 22 against the bottom edge of the stop 31. As a result, the sleeve 22 is precluded from moving any further upwardly and the lock 30 thereby retains the shield 15 in its open position. When it is desired to close the shield 15 again, it is only necessary to press the stop 31 inwardly into the shaft 11 to permit the collar 22 to pass over it and move upwardly to the closed position as illustrated in FIG. 3.

In operation, it is only necessary for a person to hold the shaft 17 by the handle 16 to carry the shield 15 over the body of the pet to protect it from precipitation, the sun or other elements. The cable 20 beneath the collar 18 is illustrated as being flexible although this portion of the leash may be fabricated of rigid stock to assist the master in retaining the shield 15 over the body of the animal. The fabric 25 has been illustrated in the drawings as being transparent for the purpose of enabling the master to observe the animal through the shield even though the latter may be in the paths of the view of the master. However, if it is preferred otherwise, the fabric 25 may be an opaque material.

From the foregoing detailed description of the illustrative embodiment of the present invention, it will be apparent that a new and improved leash for pets has been provided which incorporates a collapsible shield that may be conveniently held over the body of the pet that is being controlled by the leash to protect the pet from inclement weather or from excessive sunlight.

Although the illustrative embodiment of the invention has been described in considerable detail for the purpose of making a full disclosure of a practical operative arrangement by means of which the invention may be praticed, it is to be understood that various novel features of the invention may be incorporated in other arrangements without departing from the spirit and scope of the invention as defined in the subjoined claims.

The principles of the invention having now been fully explained in connection with the foregoing description of embodying structure, I hereby claim as my invention:

1. In a leash for pets; a shaft; a handle fixed to one end of said shaft for grasping the leash; attaching means mounted on the end of the shaft opposite said handle for attaching a pet to the leash; a collar fixed to said shaft; a sleeve slidably carried for movement along said shaft toward and away from said collar to an open position and a closed position respectively; a plurality of ribs pivotably carried by said sleeve for movement from a closed position extending along said shaft to an open position radiating from said sleeve for extension outwardly of said shaft; a plurality of supports extending from said collar, each of said supports being pivotably mounted at one end to said collar and being pivotably connected at the opposite end to one of said ribs so that as said sleeve is moved toward said collar to the open position said ribs are forced to extend outwardly from said sleeve; a flexible material secured to said ribs to be stretched and extended outwardly of said shaft by said said ribs as they are moved to the open position and to be collapsed about said shaft when said sleeve is moved away from said collar to the closed position; and locking means for locking said sleeve in the open position.

2. In a leash for pets; leash means attachable to a pet for retaining the pet under control; a slide carried by said leash means for sliding movement between an open position and a closed position; a plurality of ribs pivotally supported by said leash means and said slide to be actuated by the movement of said slide to a storage position against said leash means when said slide is in the closed position and to an open position extending radially outwardly of said leash means when said slide is in the open position; and a flexible material secured to said ribs to be collapsed by said ribs about said leash means when the ribs are in the storage position and to be stretched and extended outwardly of said leash means by said ribs when the latter are in the open position, the stretched material being in position to form a shield protecting the pet that is attached to said leash means.

3. In a leash for pets; leash means attachable to a pet for retaining the pet under control; a plurality of ribs pivotally supported by said leash means for movement between a storage position against said leash means and to an open position extending radially outwardly of said leash means; a flexible material secured to said ribs to be collapsed by the movement of said ribs to the storage position and to be stretched and extended outwardly of said leash means by the movement of said ribs to the open position, the stretched material being in a position to form a shield protecting the pet that is attached to said leash means; actuating means connected to actuate said ribs in their pivotal movement between the storage position and the open position; and locking means for locking said ribs in the open position, said locking means being actuatable to release said ribs for pivotal movement to the storage position.

4. In a leash for pets; a shaft; a handle at one end of the shaft for grasping the leash; a shield carried by said shaft; means for moving said shield between a collapsed position about said shaft for storage and an open position extending outwardly of said shaft; a lock carried by said shaft for locking said shield in the open position, said lock being actuatable to release said shield for movement to its collapsed position; and attaching means at the end of said shaft opposite said handle for attaching the pet thereto in position to be protected from the weather by said shield in the open position.

5. In a leash for pets; leash means attachable to a pet for retaining the pet under control; a shield carried by said leash means; means for moving said shield between a collapsed position about said shaft for storage and an open position extending outwardly of said leash means; and locking means for locking said shield in the open position and actuatable to release said shield for movement to the collapsed position.

6. In a leash for pets; leash means attachable to the pet for retaining the pet under control; a shield carried by said leash means; and means for moving said shield between a collapsed position about said leash for storage and an open position extending outwardly of said leash means wherein it protects the pet that is attached to said leash means from the weather.

7. In a leash for pets, leash means attachable to the pet for retaining the pet under control; and a shield supported by said leash means in a position to protect the pet from the weather; said shield be movable from a collapsed position about said leash means for storage to an open position extending outwardly of said leash means wherein it functions to protect the pet.

8. In a leash for pets; a shaft; a handle at one end of the shaft for grasping the leash; a shield mounted on said shaft for movement from a collapsed position about said shaft to an open position wherein it is disposed to protect the pet; and means at the end of said shaft opposite said handle attaching the pet which is then controlled by the leash and protected from the weather by the open shield.

References Cited by the Examiner

UNITED STATES PATENTS

| 998,462 | 7/1911 | Burch | 135—2 |
| 1,595,834 | 8/1926 | Griffiths | 54—79 |
| 2,337,970 | 12/1943 | Cassell | 119—109 |

SAMUEL KOREN, *Primary Examiner.*

HUGH R. CHAMBLEE, *Examiner.*